Figure 1:
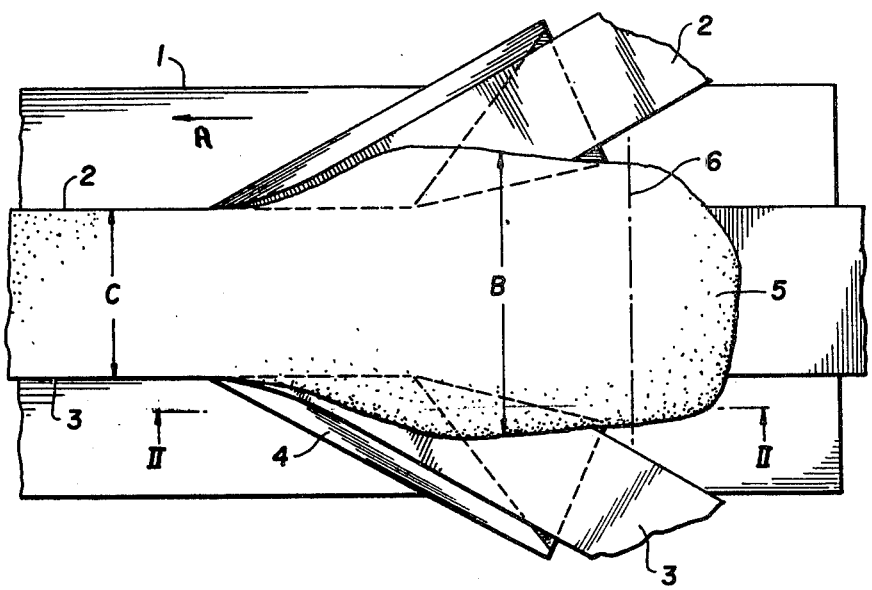

United States Patent [19]

Berg

[11] 4,096,220

[45] Jun. 20, 1978

[54] PROCESS FOR THE PRODUCTION OF SLABS OR BLOCKS OF PLASTIC FOAM

[76] Inventor: Laader Berg, Remvik, 6010 Spjelkavik, Norway

[21] Appl. No.: 632,075

[22] Filed: Nov. 14, 1975

[30] Foreign Application Priority Data

May 30, 1975 Norway .................................. 751918

[51] Int. Cl.² ............................................. B29D 27/04
[52] U.S. Cl. ....................................... 264/51; 264/216; 264/DIG. 84
[58] Field of Search ...................... 264/45.8, 46.2, 46.3, 264/54, 216, DIG. 84

[56] References Cited

U.S. PATENT DOCUMENTS

| 3,240,845 | 3/1966 | Voelker | 264/46.3 X |
| 3,325,573 | 6/1967 | Boon et al. | 264/54 |
| 3,488,800 | 1/1970 | Kornylak | 264/54 X |
| 3,560,599 | 2/1971 | Ferstenberg | 264/54 X |
| 3,768,937 | 10/1973 | Haga et al. | 264/45.8 X |
| 3,812,227 | 5/1974 | Blackwell et al. | 264/54 |
| 3,840,629 | 10/1974 | Marjoram | 264/54 |

FOREIGN PATENT DOCUMENTS 43-6,551  3/1968  Japan ..................................... 264/51

OTHER PUBLICATIONS

Knox, R. E. and R. H. Federroll, "Trouble-Shooting Guide for Molding One-Shot Resilient Polyether Foam," DuPont Foam Bulletin, New Information from DuPont about Urethane Foam, DuPont Hylone, Wilmington, Del. Elastomers Laboratory, E.I. DuPont de Nemours, Co., Inc., Nov. 30, 1960, pp. 1-11.

Primary Examiner—Philip Anderson
Attorney, Agent, or Firm—Browdy and Neimark

[57] ABSTRACT

Foam plastic is produced by pouring a mixture of liquid foam reactant into a channel-shaped conveyor where the mixture expands to form foam. The mixture is to begin with allowed to flow out beyond the breadth of the conveyor and is guided back to the normal conveyor breadth during the expansion period. An apparatus for such production includes a channel conveyor when the vertical side walls begin first after the creamline, a scraper device being installed on each conveyor side to guide the foam in between the vertical side walls.

3 Claims, 3 Drawing Figures

U.S. Patent    June 20, 1978    4,096,220

PROCESS FOR THE PRODUCTION OF SLABS OR BLOCKS OF PLASTIC FOAM

The invention relates to the production of plastic foam. According to the usual method practiced to-day, a mixture of liquid foam reactants are poured into a channel-shaped conveyor, where the mixture expands to form foam. In the production of slabs or blocks of plastic foam, the aim is to obtain as right-angled a cross-section as possible, in order to avoid waste loss when the eventual clean-cutting has to be done. The bulging upper surface which the plastic foam blocks usually get during the production are presumably due to the friction against the side walls in the channel-shaped conveyor, the surface tension in the upper portion, and the pouring method used for the fresh chemical mixture, which is poured back and forth across the block's direction of movement, and where for practical reasons and in order not to disturb the expansion process one cannot lay enough of the chemical mixture out toward the side walls.

Previous attempts have been made to avoid the undesirable bulging by using a closed mold, i.e. that the mold has a top which affects the upper surface of the plastic foam block. This results, however, in undesirable structural concentrations in the portions where the foam is subjected to direct shaping pressure. Such devices, moreover, are not well-suited to the production of foam-material blocks with low volume weights and open cells.

Plastic foil has also been used along the side walls, this foil being subjected to streching pressure in an upward direction. The results here have not been satisfactory either. Other similar undertakings have been proposed, but the results have not been good enough.

This invention has as its starting-point the fact that the main reason for the uneven thickness of the block is that the fresh chemical mixture is poured back and forth across the direction of movement of the block, and for practical reasons and in order not to disturb the expansion process, isn't laid well enough out toward the side wall. The result is therefore a block of foam which is higher in the middle and lower toward the sides. To even out this difference in thickness, the procedure in the present invention is to remove the side walls in the first part of the pouring area of the chemical mixture, so that the mixture can be spread so widely that it exceeds the breadth of the desired block to be produced. The chemical mixture will then flow freely outwards in breadth and the expansion process will start, in such a way that the beginning expansion is wider than the distance between the side walls which mark the width of the block. In order to get the chemical mixture and the commenced expansion of the foam back between the side walls again a scraper or similar device is used, placed in an oblique position against the bottom web of the conveyor and which gives a plow effect, in that the scraped-up surplus of foam which falls outside the side walls is guided back and in between the side walls which determine the width of the block. The scraper, the side-walls and the bottom web are usually covered with a flexible material, such as e.g. paper, which is usually used in the production of blocks of foam plastic, or another suitable covering may be used.

According to the invention a procedure is hereby provided for the production of plastic foam whereby a mixture of liquid foam reactants are poured into a channel-shaped conveyor where the mixture expands and forms foam; and the procedure is characterized in that the mixture is allowed, to begin with, to flow out beyond the width of the conveyor, and then during the expansion process is guided back to the normal width of the conveyor.

The side-walls may be advantageously brought to a vertical position from an outward-flattened position before the mixture has finished solidifying thus allowing the mixture to finish expanding and curing in a channel-shaped conveyor consisting of a bottom web and vertical side walls.

The process for the production of slabs or blocks of foam plastic in accordance with the present invention, preferably is carried out in an apparatus comprising appliances for supplying the mixture medium which expands into plastic foam, and a channel-shaped conveyor, consisting of a bottom web and vertical side-walls, into which the mixture medium is poured and expands into plastic foam. The apparatus is characterized in that the vertical side-walls start first after the cream-line, and that a scraper is installed on each side of the expansion area to guide the foam which falls beyond the side-walls, back and in between the vertical side walls.

It is an advantage that the side-wall covering, e.g. paper, be brought over the scrapers. Likewise, it is an advantage that the side wall covering in the expansion area be taken from rolls with mainly horizontal axes, and brought over the scrapers to a vertical position lining the walls.

Figure 2:
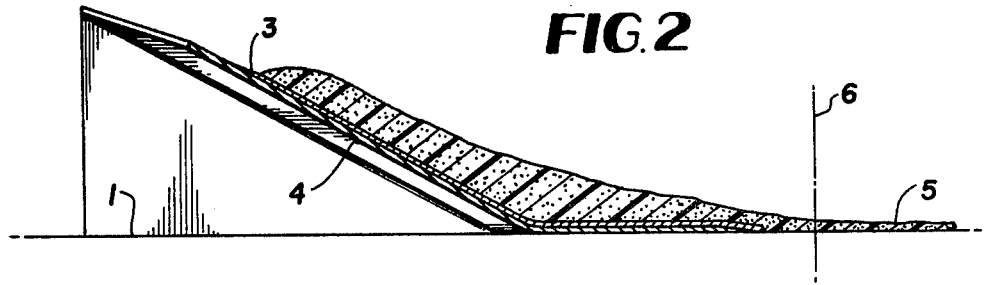

The present invention will be described more in detail with reference to the drawings, where FIG. 1 shows a plan view of an apparatus for the production of a slab of plastic foam, and FIG. 2 shows a longitudinal section through line II—II of FIG. 1.

Figure 3:
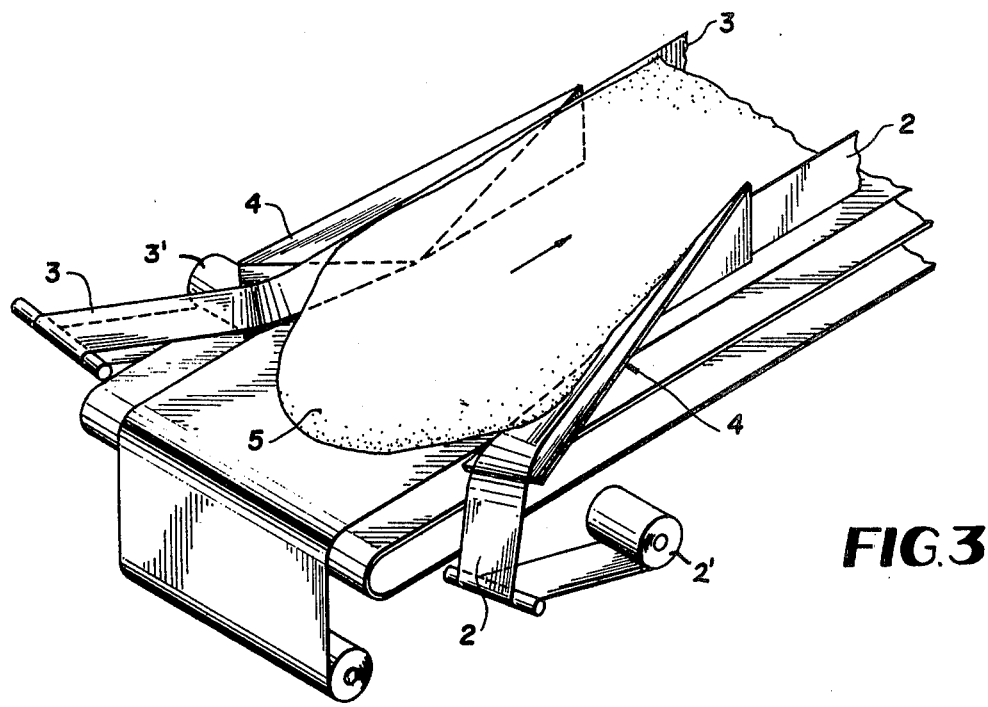

FIG. 3 shows a perspective view of the apparatus in accordance with the present invention.

In FIGS. 1 and 3 the bottom web of an apparatus for the productin of a plastic foam slab is marked 1. The direction of the bottom web's movement is indicated by arrow A. The necessary channel for the shaping of the plastic foam slab or foam block is formed by the bottom web 1 and the vertical side walls 2 and 3. The covering for the side walls 2 and 3 are brought in sidewise from horizontal rolls 2' and 3' (shown in FIG. 3). The section in FIG. 2 follows approximately the section line II—II in FIG. 1 and in this area is installed a scraper 4 which controls side-walls 2 and 3 at the same time. A scraper of this type is installed for each side-wall 2 and 3, on each side of the channel-shaped conveyor which is formed by bottom web 1 and side walls 2 and 3. The distance between the scrapers and the pouring apparatus (not shown), can be regulated.

In the production of plastic foam slabs the chemical mixture is poured onto the bottom web of the conveyor 1 in area 5 in the usual manner. The chemical mixture is allowed to flow freely outward in breadth, because it is not limited by the side walls in this area, and the ensuing rising of the foam mixture will therefore take place over a wider area than the distance between side walls 2 and 3 which define and determine the width of the slab when finished. The so-called cream-line is indicated by 6. This is the line where the expansion begins. After this line is installed a scraper on each side. The scraper 4 is set at an oblique angle to the foundation i.e. toward the bottom web 1 of the conveyor, and will guide the scraped-up surplus of foam which falls beyond the side walls back and in between the side walls. As indicated, side walls 2 and 3 and the covering therefor are brought in from the side, from an originally mainly horizontal position, i.e. approximately in a plane parallel to the horizontal bottom web 1, and these side wall and the coverings are brought over the scrapers 4 and guided to a vertical position, as shown in FIGS. 1 and 3. The breadth of the expanding foam at the moment when the guiding-back process begins is marked by B.

The apparatus shown is only roughly sketched and meant to indicate how an appropriate apparatus can appear. Technical modifications will be obvious to an expert and these are therefore also comprised in the patent claims.

Having described my invention, I claim:

1. A process for the production of foam plastic, having as right-angled a cross-section as possible, by means of formation in a channel-shaped moving conveyor having a final channel configuration with a bottom web and vertical side walls having a predetermined breadth therebetween, comprising:

pouring a mixture of liquid foamable reactants onto a portion of the moving conveyor upstream of said final channel configuration in which said mixture is allowed to flow out beyond said predetermined breadth of said final channel configuration; and during the expansion period, guiding the mixture back to said breadth of said final channel configuration by bringing side portions from an outwardly flattened horizontal position to the vertical position of said vertical side walls of said final channel configuration, before the mixture has finished expanding.

2. A process in accordance with claim 1 wherein said pouring step comprises pouring the mixture with a back and forth movement transversely across the direction of movement of said bottom web.

3. A process in accordance with claim 1 wherein said apparatus used further includes a flexible material covering both said side portions brought from a horizontal to a vertical position and said vertical side walls.

* * * * *